United States Patent [19]

Hopkins et al.

[11] Patent Number: 4,566,893
[45] Date of Patent: Jan. 28, 1986

[54] METHOD FOR FABRICATING A GLASS CRT PANEL

[75] Inventors: Maxwell M. Hopkins, Kendall Park; Arthur Miller, West Windsor Township, Mercer County, both of N.J.

[73] Assignee: RCA Corporation, Princeton, N.J.

[21] Appl. No.: 657,085

[22] Filed: Oct. 3, 1984

[51] Int. Cl.[4] ............................................. C03B 25/00
[52] U.S. Cl. ............................................. 65/69; 65/117
[58] Field of Search ...................... 65/69, 118, 119, 117

[56] References Cited

U.S. PATENT DOCUMENTS

| 2,991,591 | 7/1961 | Gabor et al. | 49/89 |
| 3,357,767 | 12/1967 | Shaffer | 316/19 |
| 3,412,992 | 11/1968 | Lindeman | 269/296 |
| 3,468,005 | 9/1969 | Kautz | 29/25.15 |
| 3,493,356 | 2/1970 | Torrence | 65/58 |
| 4,179,638 | 12/1979 | Boyd et al. | 313/480 |

FOREIGN PATENT DOCUMENTS 627348  8/1949  United Kingdom ................ 65/117

Primary Examiner—Arthur Kellogg
Attorney, Agent, or Firm—Eugene M. Whitacre; Dennis H. Irlbeck; LeRoy Greenspan

[57] ABSTRACT

A method for fabricating a glass CRT panel that exhibits high compressive surface stress and low compaction comprising thermally processing the panel during the initial annealing stage for a prescribed period of time at about those temperatures that produce minimum compaction, which processing temperatures are substantially lower than the processing temperatures that produce minimum surface stresses in the panel, and then cooling the panel to room temperature.

12 Claims, 2 Drawing Figures

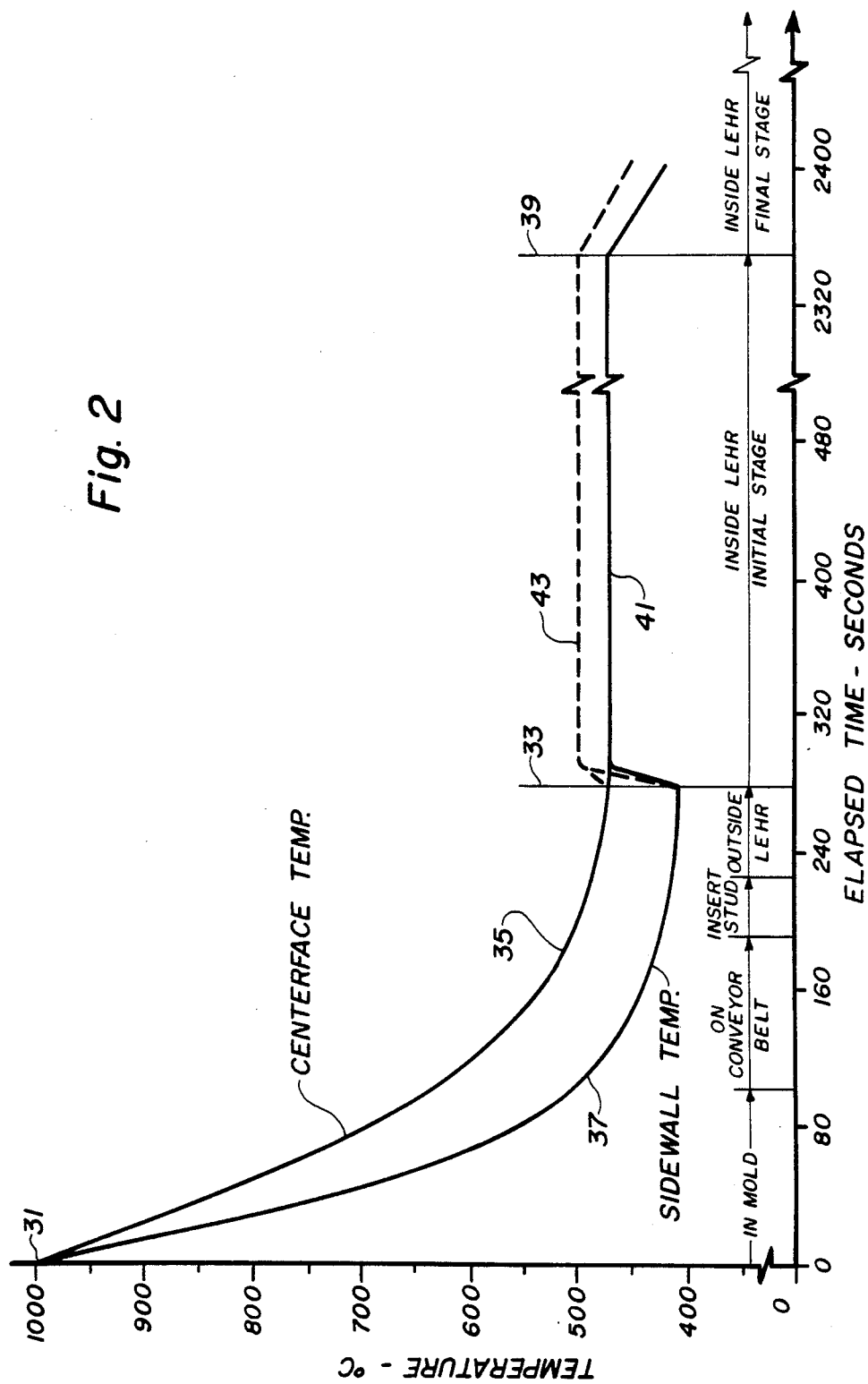

METHOD FOR FABRICATING A GLASS CRT PANEL

BACKGROUND OF THE INVENTION

This invention relates to a novel method for fabricating a glass CRT (cathode-ray tube) panel comprising a viewing window and peripheral sidewalls, and particularly to fabricating a panel which exhibits simultaneously both relatively high compressive surface stresses and relatively low compaction.

A typical process for fabricating a glass CRT panel includes pressing the panel from a gob of glass, inserting mask support studs in the sidewalls of the panel while the window of the panel is at about 500° C. and then annealing the panel. The annealing step is done in two stages including a short initial stage and a longer final stage. The shorter initial stage of annealing relaxes all of the stresses with short decay times in the glass, for example, by soaking the panel (that is, maintaining the panel in an ambient) at about 500° C. for about 35 minutes. The longer final stage of annealing cools the panel at a controlled rate that imparts to the panel a relatively uniform high compressive surface stress, but not so high and/or nonuniform as to break the panel. High compressive surface stress is desirable in order to compensate for structurally-induced tensile stresses that are later applied to the panel, particularly after the panel has been assembled into a CRT and the CRT is evacuated.

It has been observed that glass CRT panels ordinarily exhibit a degree of compaction, as determined by the procedure described below, of between 120 and 150 ppm (parts per million). Compaction is the shrinkage in size of the panel that results from the processing steps required for assembling the panel into an operable CRT. These processing steps include at least one heating step at about 425° to 450° C. for about one hour after a luminescent viewing screen has been deposited on the inside surface of the panel window. Excessive compaction after the screen has been deposited can cause faulty video color rendition by a shadow-mask-type CRT, which is the most popular design for a color television picture tube.

In order to reduce the compaction of glass CRT panels, some tube factories, after receiving the panels from the glass factory, reheat the panels to about 450° C. for about an hour. This reheating requires extra equipment, floor space, inventory, fuel and time. It is desirable therefore to provide a method for fabricating a glass CRT panel with both high compressive surface stress and low compaction, without the additional reheating step. The method should be capable of being carried out at the glass factory with existing equipment, without resorting to special jigs or unusual techniques.

SUMMARY OF THE INVENTION

In the novel method, soon after forming the panel from a gob of glass, the panel is thermally processed, during the initial annealing stage, for a prescribed time period at about those temperatures above 450° C. that produce minimum compaction, which temperatures are substantially lower than those temperatures that produce minimum surface stress. After cooling the panel to room temperature, the panel exhibits both lower compaction and higher compressive surface stress than panels which are similarly annealed at the higher temperatures ordinarily used during the initial stage of annealing. In the preferred embodiments, panels are processed at 470°±10° C. by the novel method, instead of 500°±10° C. as in prior methods.

The novel method recognizes that the soak time and temperature employed during the initial stage of annealing of a glass panel directly affect the compaction and surface stresses subsequently exhibited by the panel. Higher compressive surface stresses in panels reduce the possibility of glass failure, such as by stress corrosion, and could permit using panel surface contours that would otherwise be subject to failure. A lower degree of compaction in panels reduces the deformations which contribute to misregister between the shadow mask and the phosphor screen in a shadow-mask-type CRT. Lower compaction in panels may permit the elimination of the time-consuming and costly reheating of the panel at the tube factory.

BRIEF DESCRIPTION OF THE DRAWINGS

FIG. 2 shows a pair of time-versus-temperature curves for thermally processing a glass panel according to a specific embodiment of the novel method.

DETAILED DESCRIPTION OF THE PREFERRED EMBODIMENTS

Figure 1:
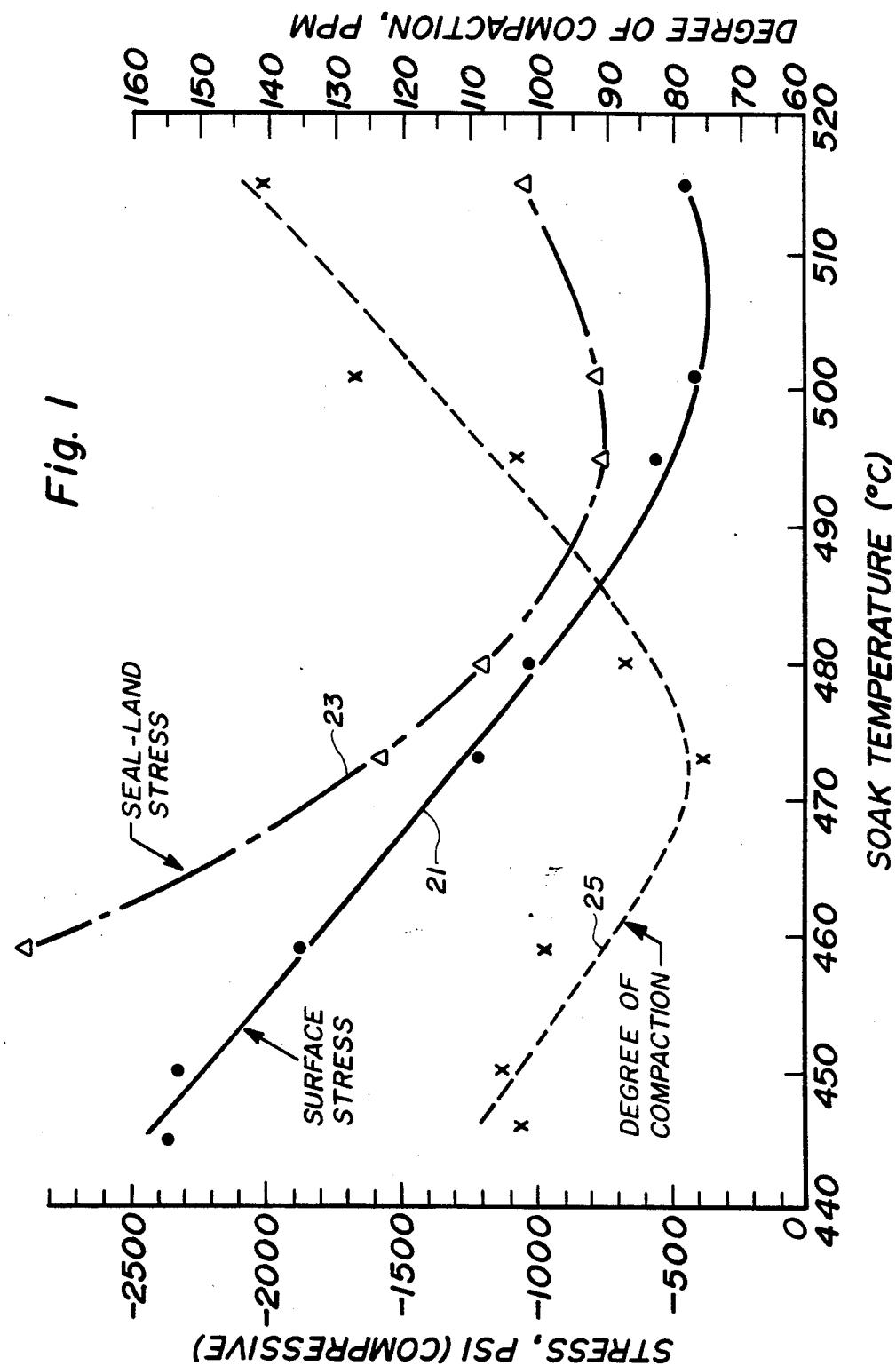
FIG. 1 is a family of curves showing the surface stress, seal-land stress and degree of compaction of glass panels thermally processed with different soak temperatures during the initial stage of annealing.

The atomic structure of any glass article depends to a certain extent on the temperature at which the article is equilibrated. If, after equilibration, the temperature of the article is changed, then the structure will change toward the new equilibrium value. The rate at which such atomic rearrangements can occur becomes smaller for lower temperatures. At room temperatures, this rate is usually so small that all structural changes are considered to be arrested.

When a glass article is cooled fairly rapidly from an elevated temperature to room temperature, the glass structure, at first, can follow its changing equilibrium value. But as the glass becomes cooler, the rate slows down so that this can no longer happen. The actual structure of the glass begins to lag behind the equilibrium structure for that temperature. Finally, when the glass reaches room temperature, a nonequilibrium structure has been "frozen-in." The frozen-in structure corresponds approximately to the equilibrium structure at some temperature, called the "fictive temperature," intermediate between room temperature and the initial elevated temperature of the glass. Lower initial temperatures of equilibration and lower cooling rates both favor lower fictive temperatures. Thus, it is possible to have two glass specimens at room temperature with the same composition, but with different fictive temperatures and somewhat different densities.

In the tube factory, after the luminescent viewing screen is photolithographically deposited on the window of a glass panel by exposure through the shadow mask, the glass panel is subjected to three distinct thermal cycles (screen bake, frit seal and exhaust). If the fictive temperature of the glass is appreciably higher than the peak temperatures for the subsequent thermal processing cycles, then, when the glass is cooled to room temperature, its structure and consequently its dimensions will have changed. These dimensional changes, referred to as compaction, disturb the delicate alignments, such as those between the shadow mask and phosphor-screen pattern, that were established in the lighthouse prior to additional thermal processing.

The degree of compaction of a glass sample, which gauges the susceptibility of the glass sample to dimensional changes due to thermal processing, is determined herein by the following procedure. A distance L, typically about 10 centimeters, is measured between two scribed fiducial marks on the glass sample. The glass sample is then subjected to a thermal processing that simulates the anticipated thermal cycling. After processing, the distance L is remeasured, and the change in length $\Delta L$ divided by the initial length L and multiplied by $10^6$ is the degree of compaction in ppm (parts per million). The degree of compaction of a glass panel for a CRT when it leaves the glass factory should not exceed 150 parts per million (PPM). At present, the degree of compaction of glass panels for 25V CRTs ranges from about 120 ppm to 150 ppm. Degrees of compaction in this range can cause unacceptable misregister in finished CRTs. Because of this, glass panels are subjected to a thermal processing at the CRT factory, prior to photodepositing the viewing screen in alignment with the shadow mask, to reduce the subsequent dimensional change.

Tensile stresses of considerable magnitude are induced on the front face of an operable CRT by the pressure differential between the exterior (at atmospheric pressure) of the picture tube and the evacuated interior. Tensile stresses found at the screen edge can ultimately result in stress corrosion failure, whereby a crack formed at the surface of the glass can propagate to the interior resulting in tube failure. The rate of crack propagation is enhanced by stress and moisture.

In our tests for stress, a Soleil compensator (calibrated adjustable retarder) was used to measure the stress birefringent retardation of each glass sample. The birefringent retardation is proportional to the intensity of the stress. A 0.5-inch-wide sample was cut along the minor axis of a 25V CRT panel. The optical path of the measuring system is composed of the following components in series: a white light source, a ground glass plate, a polarizer oriented at forty-five degrees to the surface of the sample, the glass sample, a Soleil compensator with the fast and slow axes oriented parallel and perpendiculr to the surface of the sample, an analyzer crossed with respect to the polarizer, and a telescope for viewing the sample. When that part of the light from the source traveling through the system is extinguished, the birefringence of the sample is equal in magnitude and orientation to that of the compensator.

Since there can be no stress component normal to a free surface, a birefringence measurement made with the light grazing just inside the molded surface of a sample or the seal land of a panel can be equated to an actual stress value at the surface integrated along the optical path. When measuring along a path removed from a free surface, what is observed is not the actual stress, but rather the stress anisotropy integrated along the optical path. Stress values can be calculated from the relationship $$\delta = \frac{(\Gamma_1 - \Gamma_o)C}{t\,\alpha}$$

where
$\delta$ is the stress in pounds per square inch (psi).

$\Gamma_o$ is the null compensator reading with no sample in the optical path and the light extinguished.
$\Gamma_1$ is the compensator reading when the dark compensating band is at the point of measurement.
C is the compensator calibration factor for white light.
t is the path length through the sample.
$\alpha$ is the stress optical coefficient for color picture tube panel glass experimentally determined to be $2.05 \times 10^{-8}$/psi.

For preliminary experiments, a high-temperature oven suitable for the necessary initial annealing stage was located approximately the same distance from the stud-insertion machine as the entrance to the annealing lehr. Great care was taken in handling the glass panels so as not to impose any variation from normal handling until they are placed into the oven for thermal processing. In the particular experiments, about 165 seconds elapsed between the removal of the panel from the mold and the passing of the panel through the lehr curtain.

The experimental initial annealing stage included soaking panels at 515° C. and 500° C. for various soak times, as shown in the Table, to establish a soak time at each temperature that would insure a stress-free equilibrium state. Then any resultant stress in the panel would be solely thermally induced through the subsequent cooling from that temperature during the final annealing stage. The soak times used in the investigation were chosen so that the longest values at each temperature were many times greater than the times for stress relief estimated from considerations involving viscosity. Also shown in the Table are the resulting compressive surface stress and degree of compaction. The data in the Table evidences that, at each temperature, the resulting stresses decrease monotonically with time. Thus, there were components of stress that persisted many times longer than would have been expected from simple considerations involving the variation of glass viscosity with temperature.

When a glass panel is annealed at a constant temperature, the stress decreases according to a decay law that differs from a simple exponential decay. Therefore, there can be components of stress with a spread in relaxation times. Components with long relaxation times, much longer than relaxation times inferred from viscosity measurements, were responsible for the variations observed in the Table. Stresses induced at high temperatures (those induced from rapid cooling before the initial annealing stage) give rise to structures in the glass that have a higher effective activation energy for stress relief than those induced at lower temperatures. This would account for the greater persistence of such stresses.

These findings led us to the novel method for preparing glass panels with high compressive surface stresses and low compactions. The novel method uses that component of stress that is induced before the introduction of the panels into the annealing lehr, rather than relying solely on the thermal processing in the lehr for the main part of the stress induction. A thermal schedule for the lehr can then be instituted that can be made more nearly optimum for establishing a low degree of compaction, while at the same time retaining a useful portion of the stresses present before introduction of the ware into the lehr.

Panels were thermally processed after removal from the stud-insertion machine at the initial annealing stage with soak temperatures of 515° C., 501° C., 495° C., 480° C., 473° C., 459° C., 450° C., and 445° C. for about 1920 seconds. Cooling rates were all the same at about 9° C. per minute (a typical lehr cooling rate). Soak times ranged from about 32 minutes to 39 minutes in accordance with soak temperature so that the total duration of each run was 75 minutes, which again is equivalent to the panel transit time in the lehr to when it exits the tunnel. The annealing schedules were designed to be compatible with the available lehr. After being annealed, the panels were measured for seal land stress, surface stress and compaction.

FIG. 1 shows plots of the compressive surface stress 21, seal land stress 23 and compaction 25 versus soak temperature for the specially thermally processed panels.

The seal land stresses varied from −4300 psi at a low-temperature soak to −1050 psi at the high-temperature soak with a minimum of about −800 psi when the panel was soaked at 495° C.

The plot 21 of surface stress versus soak temperature goes through a minimum at about 500° C., which is where commercial initial stage annealing is conducted. On the high-temperature side of the minimum, the initially-induced stresses developed prior to oven insertion are more completely relieved. Surface stresses developed through cooling in the oven become more dominant at the higher soak temperatures. On the low-temperature side of the minimum, just the opposite is true. The panel is inserted into the oven where the temperature is such that it inhibits relaxation of the previously-induced high-temperature stresses and tends to preserve them. The cooling rate will have very little effect on the surface stress at these lower temperatures.

Variations in thermal processing procedures can affect the value of surface stress and the degree of compaction. A panel was allowed to rest on the stud machine 30 seconds longer than normal prior to placing into the oven at 473° C. to replicate a previous thermal processing run. At oven insertion, the panel temperature was about 6° C. colder (panel temperature measured at the plunger surface) than a panel handled normally. The experimental results showed that the panel allowed to rest on the stud machine for an extra 30 seconds had about 15 percent higher surface stress for that particular thermal processing temperature than a panel handled normally. A panel with a lower temperature at oven insertion will have a higher surface stress than a panel with a higher temperature. It will take the lower-temperature panel longer to thermally equilibrate at the soak temperature; thus less stress relaxation can occur. The combination of a higher residual stress upon being placed into the oven and a shorter time interval at the soak temperature to allow for stress relaxation will result in a panel with higher surface stress. The soak temperature will have less effect on a panel being placed into the oven at a lower temperature.

A plot 25 of degree of compaction versus soak temperature (FIG. 1) shows a minimum at about 470° C. The degree of compaction minimum is about 30° C. lower than the minimum in the plot 21 of surface stress, where prior panels were thermally processed. A soak temperature at or near the compaction minimum (±10° C.) is advantageous for producing a glass panel with both high compressive surface stress and low compaction. All of the thermal processing schedules used resulted in a compaction equal to, or considerably better than, the present product.

The novel thermal processing schedules are quite simple. They involve only a constant-temperature soak and cooling at a regular rate. Further optimization of the glass properties could be achieved using more complicated schedules involving a multiplicity of soak temperatures and/or cooling rates, or time-varying heating or cooling rates. Optimization of particular individual glass properties is well known. However, using complicated thermal schedules in the annealing lehr would probably not be worth the effort because it would result only in a marginal improvement in surface stress and compaction.

Until recently it was thought that a panel with a high surface stress would also have a high degree of compaction. With the novel method, the resultant stresses and compaction are differently dependent on soak temperature, and a glass panel can exhibit simultaneously a high compressive surface stress and a low degree of compaction after its initial thermal processing at the glass factory. This is achieved using that component of stress induced in the panel as it travels from the mold to the stud-insertion machine, rather than by using thermal processing in the lehr for stress induction. At least part of this is due to structural states whose associated stresses and deviations of volume from equilibrium may both be high. However, degree of compaction is not a measure of the deviation of volume from equilibrium; it is a measure of how much this deviation changes for a specified thermal process. Thus, if the relaxation time for these structural changes is longer than typically encountered, then little relaxation will occur during the specified thermal process, and the resulting degree of compaction will be lower.

EXAMPLE

Referring to FIG. 2, a glass gob at about 1000° C. is pressed to the desired shape of a glass panel in a metal mold and cooled in about 100 seconds and then removed from the mold. Upon removal, the window centerface surface temperature is about 600° C., and the sidewall surface temperature is about 500° C. The panel is placed on a conveyor belt and carried to the stud-insertion machine where mask support studs are inserted in the panel sidewalls, and then placed on the lehr conveyor. The lehr conveyor then carries the panel through the lehr curtain into the lehr tunnel where thermal processing is carried out. The elapsed time between the gob entering the mold shown by the point 31 in FIG. 2 and the passage of the panel through the lehr curtain shown by the line 33 is about 269 seconds. In that period of time, the centerface surface temperature shown by the upper curve 35 falls to about 480° C., and the sidewall surface temperature shown by the curve 37 falls to about 400° C. After passing through the lehr curtain, the panel is exposed to a soak temperature of about 470° C. for about 35 minutes (2100 seconds) to the time line 39, during which the entire panel equilibrates to that temperature, as shown by the solid curve segment 41. The panel is then cooled in the usual way to room temperature at about 11° C. per minute or less. In prior processes, which produced panels with lower surface compressive stress and higher compaction, the panels were soaked at a higher temperature of about 500° C. as shown by the dash-line curve segment 43.

TABLE

| Initial Thermal Processing Experiment | | | | | |
|---|---|---|---|---|---|
| Temperature Soak Parameters | | | Measured Stress (PSI) | | |
| Temp. (°C.) | Time (Min.) | Cooling Rate (°C./Min.) | Surface | Seal Land | Compaction (ppm) |
| 515 | 5 | 10.3 | −824 | −1232 | 183 |
| 515 | 15 | 10.8 | −462 | −1061 | 186 |
| 515 | 135 | 11.0 | −379 | −977 | 160 |
| 500 | 17 | 12.3 | −714 | −999 | 160 |
| 500 | 50 | 11.9 | −367 | −801 | 131 |
| 500 | 150 | 12.0 | −246 | −725 | 117 |
| 500 | 360 | 11.8 | −200 | −638 | 111 |

What is claimed is:

1. Method for fabricating a glass panel comprising a viewing window and peripheral sidewalls for a cathode-ray tube, which panel exhibits high compressive surface stress and low dimensional change when reheated from room temperatures to temperatures above 450° C. and then cooled to room temperature, said method comprising
   A. forming said panel from a gob of molten glass,
   B. permitting said panel to cool to temperature within an annealing range which will subsequently produce minimum compaction in said window whereby substantial stresses with relatively long relaxation times are induced in said window,
   C. maintaining the window of said panel during the initial annealing stage for a prescribed period of time at about said temperatures within said annealing range that produce minimum compaction in said window, said combination of time and temperature being sufficient for relieving stresses with relatively short relaxation times while retaining stresses with relatively long relaxation times,
   D. and then cooling said panel to room temperature.

2. The method defined in claim 1 wherein at step A said gob has an initial temperature above about 1000° C., and step C is conducted before said panel has cooled below about 400° C.

3. The method defined in claim 2 wherein at step C said panel is maintained at about 470° C.

4. The method defined in claim 2 wherein, between step A and C, metal studs are inserted in the sidewalls of said panel, and the temperatures of the surfaces of said panel fall without interruption into the range of about 400° to 500° C.

5. The method defined in claim 2 wherein the temperatures that product minimum compaction are in the range of 460° to 480° C. and the temperatures that produce minimum surface stress are in the range of 490° to 510° C.

6. A method for fabricating a glass panel comprising a viewing window and peripheral sidewalls for a cathode-ray tube, said panel exhibiting low dimensional change during assembly into an operable cathode-ray tube, said method comprising
   A. forming said panel from a gob of molten glass,
   B. permitting said panel to cool to temperatures within an annealing range which will subsequently produce minimum compaction in said window whereby substantial stresses with relatively long relaxation times are induced in said window,
   C. before the panel has cooled below 400° C., maintaining the window of said panel during the initial annealing stage for a prescribed period of time at about said temperatures within said annealing range that result in minimum compaction in said window, said combination of time and temperature being sufficient for relieving stresses with relatively short relaxation times while retaining stresses with relatively long relaxation times,
   D. and then reducing the temperature of said panel to room temperature.

7. The method defined in claim 6 wherein step C includes subjecting said window to substantially constant temperatures of about 470°±10° C. for a period of about 30 to 40 minutes.

8. The method defined in claim 7 wherein said window exhibits minimum surface stress after being maintained at about 500° C.±10° C. and minimum compaction after being maintained at about 470°±10° C.

9. A method for fabricating a glass panel comprising a viewing window and peripheral sidewalls, wherein said window exhibits a lesser degree of compaction than 100 ppm after reheating from room temperature to about 450° C. and then cooling to room temperature, said method comprising
   A. forming said panel from a gob of molten glass,
   B. permitting said panel to cool to temperatures within an annealing range above 400° C., which temperatures will subsequently produce minimum compaction in said window, whereby substantial stresses with relatively long relaxation times are induced in said window,
   C. maintaining the window of said panel during the initial annealing stage in a narrow temperature range above 450° C. at about said temperatures within said annealing range that produce minimum compaction in said window and substantially lower than the temperatures that produce minimum stress in said window, said combination of time and temperature being sufficient for relieving stresses with relatively short relaxation times while retaining stresses with relatively long relaxation times, said thermal processing occurring before said article has ever cooled below 400° C.,
   D. and then reducing the temperature of said panel to room temperature during the final annealing stage.

10. The method defined in claim 9 wherein said panel exhibits a minimum compaction after being maintained at about 470°±10° C. and minimum surface stresses after being maintained at about 500°±10° C.

11. The method defined in claim 10 wherein, at step C, said window is maintained in the range of about 470° C.±10° C. in air.

12. The method defined in claim 11 wherein, in step D, said panel is cooled at a rate of about 11° C. per minute or less.

* * * * *